US011026195B2

(12) United States Patent
Lyu et al.

(10) Patent No.: US 11,026,195 B2
(45) Date of Patent: Jun. 1, 2021

(54) COMMUNICATION METHOD AND DEVICE

(71) Applicant: HUAWEI TECHNOLOGIES CO., LTD., Guangdong (CN)

(72) Inventors: Yongxia Lyu, Ottawa (CA); Zhiheng Guo, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/266,404

(22) Filed: Feb. 4, 2019

(65) Prior Publication Data

US 2019/0174437 A1    Jun. 6, 2019

Related U.S. Application Data

(63) Continuation of application No. PCT/CN2017/096419, filed on Aug. 8, 2017.

(30) Foreign Application Priority Data

Aug. 12, 2016 (CN) .......................... 201610664686.3

(51) Int. Cl.
*H04W 56/00* (2009.01)
*H04W 72/04* (2009.01)
(Continued)

(52) U.S. Cl.
CPC ......... *H04W 56/001* (2013.01); *H04L 5/0048* (2013.01); *H04L 5/0092* (2013.01);
(Continued)

(58) Field of Classification Search
None
See application file for complete search history.

(56) References Cited

U.S. PATENT DOCUMENTS 8,422,455 B1   4/2013 Dinan
2008/0205351 A1  8/2008 Lindoff et al.
(Continued)

FOREIGN PATENT DOCUMENTS

CN   101636992 A   1/2010
CN   102325382 A   1/2012
(Continued)

OTHER PUBLICATIONS

U.S. Appl. No. 62/357,945, filed Jul. 2, 2016, Eunsun Kim, Suckchel Yang and Hyunsoo Ko. The title of the provisional application is "Initial Access Procedure considering Analog Beam and Different Numerologies". This is a provisional application of Kim et al., US Pub. 2019/0230696.*

(Continued)

*Primary Examiner* — Gregory B Sefcheck
*Assistant Examiner* — Amarnauth G Persaud
(74) *Attorney, Agent, or Firm* — Womble Bond Dickinson (US) LLP (57) ABSTRACT

In a communication method disclosed in this application, a terminal device receives, from a network device, a synchronization signal and a system information signal that are generated based on a first subcarrier spacing. The terminal device sends a random access request signal to the network device based on a second subcarrier spacing and a first transmission resource, where a type of the first transmission resource corresponds to a third subcarrier spacing and/or a fourth subcarrier spacing. The terminal device further receives a random access response signal generated based on the fourth subcarrier spacing, where the random access response signal is used for instructing the terminal device to access a network or the random access response signal is used for instructing the terminal device to prepare to access network. Thereby, cell search for and random access to a (Continued)

network using a plurality of subcarrier spacings can be supported.

17 Claims, 3 Drawing Sheets

(51) Int. Cl.
*H04L 27/26* (2006.01)
*H04W 74/08* (2009.01)
*H04W 74/00* (2009.01)
*H04L 5/00* (2006.01)

(52) U.S. Cl.
CPC ...... *H04L 27/2602* (2013.01); *H04L 27/2646* (2013.01); *H04W 72/04* (2013.01); *H04W 74/004* (2013.01); *H04W 74/006* (2013.01); *H04W 74/085* (2013.01); *H04L 5/0094* (2013.01)

(56) References Cited

U.S. PATENT DOCUMENTS

| | | |
|---|---|---|
| 2014/0241284 A1 | 8/2014 | Zhou |
| 2015/0016410 A1 | 1/2015 | Lee et al. |
| 2015/0103960 A1 | 4/2015 | Mohammed et al. |
| 2016/0218849 A1 | 7/2016 | Bertrand et al. |
| 2017/0094547 A1* | 3/2017 | Yum .................... H04W 56/001 |
| 2018/0035421 A1* | 2/2018 | Lin .................... H04W 74/0833 |
| 2018/0049169 A1* | 2/2018 | Lin ........................ H04L 5/0007 |
| 2018/0343088 A1 | 11/2018 | Kusashima et al. |
| 2019/0149384 A1* | 5/2019 | Kim .................... H04L 27/2666 370/328 |
| 2019/0182002 A1* | 6/2019 | Lei ........................ H04W 56/001 |
| 2019/0223157 A1* | 7/2019 | Hwang ............. H04W 74/0833 |
| 2019/0230696 A1* | 7/2019 | Kim .................... H04W 74/0833 |

FOREIGN PATENT DOCUMENTS

| | | |
|---|---|---|
| CN | 103096389 A | 5/2013 |
| CN | 103220796 A | 7/2013 |
| CN | 104244420 A | 12/2014 |
| CN | 105723789 A | 6/2016 |
| WO | 2017/156224 A1 | 9/2017 |

OTHER PUBLICATIONS

Lenovo, Random Access Procedure for NB-IoT. 3GPP TSG RAN WG1 Meeting #84 St Julian's, Malta, Feb. 15-19, 2016, R1-161009, 4 pages.
XP051053667 R1-160327 Huawei et al.,"Remaining NB-IoT random access physical layer aspects",3GPP TSG RAN WGl Meeting #84,St Julian"s, Malta, Feb. 15-19, 2016, 4 pages.

\* cited by examiner

COMMUNICATION METHOD AND DEVICE

CROSS-REFERENCE TO RELATED APPLICATIONS

This application is a continuation of International Application No. PCT/CN2017/096419, filed on Aug. 8, 2017, which claims priority to Chinese Patent Application No. 201610664686.3, filed on Aug. 12, 2016. The disclosures of the aforementioned applications are hereby incorporated by reference in their entireties.

TECHNICAL FIELD

This application relates to the communication field, and in particular, to a communication method and a device.

BACKGROUND

In conventional digital signal transmission, an information stream is transmitted through one channel at a time. This is a serial transmission manner. A multicarrier technology uses a parallel transmission manner. Serial-to-parallel conversion is performed on serial high-speed information streams to segment the serial high-speed information streams into a plurality of parallel low-speed information streams, and then the plurality of parallel low-speed information streams are overlapped for transmission, to form a multicarrier transmission system. That is, the multicarrier technology is a technology in which high-speed data information is transmitted by using a plurality of carriers. A carrier is a radio wave of a particular frequency that carries data.

A multicarrier transmission technology has been widely applied to communication systems such as a fourth generation (4G) mobile communication system and a series of systems in the Institute of Electrical and Electronics Engineers (IEEE) 802.11. In current communication systems, services supported by the systems are relatively uniform, and each communication system supports a waveform of only one type of subcarrier spacing. In a future fifth generation (5G) mobile communication system, a serving cell of a network device can support a plurality of types of subcarrier spacings, so that the serving cell can use signals of different subcarrier spacings to serve terminal devices having different requirements in different services and different deployment scenarios.

However, how a terminal device accesses a network that communicates by using a plurality of subcarrier spacings is a problem that urgently needs to be resolved.

SUMMARY

In view of the above, this application provides a communication method and a device, to resolve a problem of how to access a network that supports a plurality of subcarrier spacings.

According to one aspect, this application provides a communication method. The method includes: receiving, by a terminal device from a network device, a synchronization signal and a system information signal that are generated based on a first subcarrier spacing, where the system information signal includes indication information used for indicating a second subcarrier spacing, and the second subcarrier spacing is a subcarrier spacing used by the terminal device to send a random access request signal; sending, by the terminal device, the random access request signal to the network device based on the second subcarrier spacing and a first transmission resource, where a type of the first transmission resource corresponds to a third subcarrier spacing and/or a fourth subcarrier spacing, the third subcarrier spacing is a subcarrier spacing used by the terminal device to send an uplink signal, and the fourth subcarrier spacing is a subcarrier spacing used by the terminal device to monitor a downlink signal; and receiving, by the terminal device from the network device, a random access response signal generated based on the fourth subcarrier spacing, where the random access response signal is used for instructing the terminal device to access a network or the random access response signal is used for instructing the terminal device to prepare to access the network.

According to the communication method in this application, the terminal device feeds back, to the network device after receiving the system information signal, the subcarrier spacing used to transmit the uplink signal and/or the subcarrier spacing used to monitor the downlink signal that is determined by the terminal device, thereby supporting cell search for and random access to a network using a plurality of subcarrier spacings.

In one embodiment, when the random access response signal indicates that the terminal device prepares to access the network, the random access response signal further includes indication information used for indicating a second transmission resource, the second transmission resource is used for transmitting the uplink signal, and the method further includes: sending, by the terminal device based on the second transmission resource and the third subcarrier spacing, a signal including a message 3 to the network device, where the message 3 includes identification information of the terminal device, so that the network device determines, based on the identification information, whether the terminal device can access the network; and receiving, by the terminal device from the network device, an access acknowledgement signal generated based on the fourth subcarrier spacing, where the access acknowledgement signal is used for instructing the terminal device to access the network.

According to the communication method in this application, the terminal device reports the identification information of the terminal device, and requests the network device to determine, based on the identification information, whether the terminal device may access the network, thereby avoiding a communication collision between terminal devices in a scenario in which there are many terminal devices in the network.

In one embodiment, the method further includes: receiving, by the terminal device, configuration information from the network device, where the configuration information is used for configuring a fifth subcarrier spacing, and the fifth subcarrier spacing is a subcarrier spacing used after the terminal device accesses the network. In this way, communication of a network using a plurality of subcarrier spacings can be supported.

In one embodiment, the configuration information is carried in the access acknowledgement signal, thereby reducing signaling overheads.

In one embodiment, the random access request signal includes a preamble sequence, and a type of the preamble sequence corresponds to the third subcarrier spacing and/or the fourth subcarrier spacing. In this way, the terminal device can flexibly select a manner of indicating the subcarrier spacing used to transmit the uplink signal and/or detect the downlink signal.

According to another aspect, this application provides a communication method. The method includes: sending, by a network device, a synchronization signal and a system information signal that are generated based on at least two types of subcarrier spacings, where the system information signal includes indication information used for indicating a second subcarrier spacing, and the second subcarrier spacing is a subcarrier spacing used by a terminal device to send a random access request signal; receiving, by the network device from the terminal device by using a first transmission resource, the random access request signal generated based on the second subcarrier spacing, where a type of the first transmission resource corresponds to a third subcarrier spacing and/or a fourth subcarrier spacing, the third subcarrier spacing is subcarrier spacing used by the terminal device to send an uplink signal, and the fourth subcarrier spacing is a subcarrier spacing used by the terminal device to monitor a downlink signal; and sending, by the network device to the terminal device, a random access response signal generated based on the fourth subcarrier spacing, where the random access response signal is used for instructing the terminal device to access a network or the random access response signal is used for instructing the terminal device to prepare to access the network.

According to the communication method in this application, the network device sends the synchronization signal and the system information signal that are generated based on the at least two types of subcarrier spacings, and receives the subcarrier spacing used to transmit the uplink signal and/or the subcarrier spacing used to monitor the downlink signal, where the subcarrier is determined by the terminal device and is fed back by the terminal device, thereby supporting cell search for and random access to a network using a plurality of subcarrier spacings.

In one embodiment, when the random access response signal indicates that the terminal device prepares to access the network, the random access response signal further includes indication information used for indicating a second transmission resource, the second transmission resource is used for transmitting the uplink signal, and the method further includes: receiving, by the network device from the terminal device by using the second transmission resource, a signal that includes a message 3 and that is generated based on the third subcarrier spacing, where the message 3 includes identification information of the terminal device; determining, by the network device based on the identification information, that the terminal device accesses the network; and sending, by the network device, an access acknowledgement signal to the terminal device based on the fourth subcarrier spacing, where the access acknowledgement signal is used for instructing the terminal device to access the network.

According to the communication method in this application, the network device receives the identification information of the terminal device that is reported by the terminal device, and determines, based on the identification information, whether the terminal device may access the network, thereby avoiding a communication collision between terminal devices in a scenario in which there are many terminal devices in the network.

In one embodiment, the method further includes: sending, by the network device, configuration information to the terminal device, where the configuration information is used for configuring a fifth subcarrier spacing, and the fifth subcarrier spacing is a subcarrier spacing used after the terminal device accesses the network. In this way, communication of a network using a plurality of subcarrier spacings can be supported.

In one embodiment, the configuration information is carried in the access acknowledgement signal, thereby reducing signaling overheads.

In one embodiment, the fifth subcarrier spacing includes at least two types of subcarrier spacings. In this way, UE can use resources corresponding to a plurality of types of subcarrier spacings, to increase a communication rate between the network device and the terminal device.

In one embodiment, the random access request signal includes a preamble sequence, and a type of the preamble sequence corresponds to the third subcarrier spacing and/or the fourth subcarrier spacing. In this way, the terminal device can flexibly select a manner of indicating the subcarrier spacing used to transmit the uplink signal and/or detect the downlink signal.

According to still another aspect, this application provides a terminal device. The terminal device may implement functions performed by the terminal device in the methods in the foregoing aspects, and the functions may be implemented by using hardware, or may be implemented by hardware executing corresponding software. The hardware or the software includes one or more units or modules corresponding to the foregoing functions.

In one embodiment, a structure of the terminal device includes a processor and a transceiver. The processor is configured to support the terminal device in performing the corresponding functions in the foregoing methods. The transceiver is configured to support communication between the terminal device and another network element. The terminal device may further include a memory. The memory is configured to couple to the processor and stores a program instruction and data that are necessary to the terminal device.

According to still another aspect, this application provides a network device. The network device may implement functions performed by the network device in the methods in the foregoing aspects, and the functions may be implemented by using hardware, or may be implemented by hardware executing corresponding software. The hardware or the software includes one or more units or modules corresponding to the foregoing functions.

In one embodiment, a structure of the network device includes a processor and a transceiver. The processor is configured to support the network device in performing the corresponding functions in the foregoing methods. The transceiver is configured to support communication between the network device and another network element. The network device may further include a memory. The memory is configured to couple to the processor and stores a program instruction and data that are necessary to the network device.

According to still another aspect, this application provides a communication system. The communication system includes the terminal device and the network device according to the foregoing aspects.

According to still another aspect, this application provides a computer readable storage medium, configured to store a computer software instruction used by the foregoing terminal device, and including a program designed for executing the foregoing aspects.

According to still another aspect, this application provides a computer readable storage medium, configured to store a computer software instruction used by the foregoing network device, and including a program designed for executing the foregoing aspects.

According to still another aspect, this application provides a communication chip, storing an instruction. When the instruction is run on a terminal device, the communication chip is enabled to perform the methods in the foregoing aspects.

According to still another aspect, this application provides a communication chip, storing an instruction. When the instruction is run on a network device, the communication chip is enabled to perform the methods in the foregoing aspects.

DESCRIPTION OF EMBODIMENTS

The following describes technical solutions in this application with reference to accompanying drawings.

It should be understood that the technical solutions of this application may be applied to various communication systems, for example, a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, a universal mobile telecommunications system (UMTS), and a future 5G communication system.

It should be further understood that in this application, a terminal device may communicate with one or more core networks through a radio access network (RAN). The terminal device may be referred to as an access terminal, user equipment (UE), a subscriber unit, a subscriber station, a mobile station, a mobile console, a remote station, a remote terminal, a mobile device, a user terminal, a terminal, a radio communication device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

In this application, a network device may be configured to communicate with a terminal device. The network device may be a base transceiver station (BTS) in GSM or CDMA, may be a NodeB (NB) in WCDMA, or may be an evolved NodeB (eNB) in LTE. Alternatively, the network device may be a relay station, an access point, an in-vehicle device, a wearable device, a base station device in a future 5G network, or the like. This is not limited in this application, but for ease of description, the following embodiments use a base station and UE as an example for description.

Figure 1:
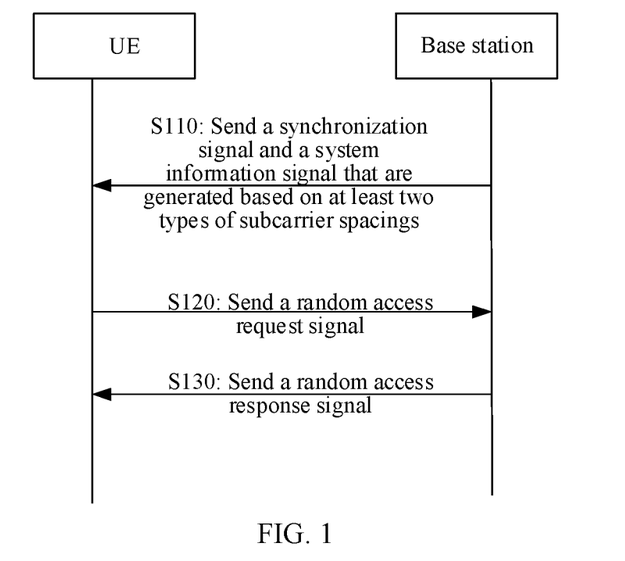
FIG. 1 is a schematic flowchart of a communication method according to one embodiment of this application.

FIG. 1 is a schematic diagram of a communication method 100 according to this application. As shown in FIG. 1, the method includes the following operations.

Operation S110: A base station sends a synchronization signal and a system information signal that are generated based on at least two types of subcarrier spacings, where the system information signal includes indication information used for indicating a second subcarrier spacing, the second subcarrier spacing is a subcarrier spacing used by UE to send a random access request signal, and the at least two types of subcarrier spacings include a first subcarrier spacing.

Operation S120: The UE sends the random access request signal to the base station based on the second subcarrier spacing and a first transmission resource, where a type of the first transmission resource corresponds to a third subcarrier spacing and/or a fourth subcarrier spacing, the third subcarrier spacing is a subcarrier spacing used by the UE to send an uplink signal, and the fourth subcarrier spacing is a subcarrier spacing used by the UE to monitor a downlink signal.

Operation S130: The base station sends, to the UE, a random access response signal generated based on the fourth subcarrier spacing, where the random access response signal is used for instructing the UE to access a network or the random access response signal is used for instructing the UE to prepare to access the network.

In this application, the UE can establish, after powered on, a communication link with a base station only after performing cell search, obtaining cell system information, and performing random access. The UE may synchronize a frequency and a symbol with those of a cell after cell search, and may obtain system frame timing (that is, a start location of a downlink frame) and determine a physical cell identifier (PCI) of the cell.

UEs supporting different subcarrier spacings may exist in a current cell. Therefore, when the base station sends the synchronization signal, a broadcast signal, and the system information signal based on a plurality of types of subcarrier spacings, so that all of UEs supporting different subcarrier spacings can receive the foregoing signals, the UEs may monitor the foregoing signals based on one type of subcarrier spacing, or monitor the foregoing signals based on a plurality of types of subcarrier spacings. In this application, the sending a signal based on one type of subcarrier spacing means generating a multicarrier signal through modulation by using the subcarrier spacing, and then transmitting the multicarrier signal into the air; and the monitoring a signal based on one type of subcarrier spacing means receiving the signal, and then demodulating the received signal by using the subcarrier spacing.

In operation S110, the base station sends the synchronization signal and the system information signal that are generated based on the at least two types of subcarrier spacings, where the synchronization signal is used for helping the UE implement time-frequency synchronization with the base station and obtain a PCI of the base station. The base station may further send a broadcast signal generated based on the at least two types of subcarrier spacings, and the at least two types of subcarrier spacings include the first subcarrier spacing, where the system information signal further carries the indication information used for indicating the second subcarrier spacing, and the indication information instructs the UE to generate the random access request signal by using the second subcarrier spacing when the UE sends the random access request signal, so that the base station monitors the random access request signal on an uplink channel based on the second subcarrier spacing. The second subcarrier spacing that the base station indicates to the UE may be a specific subcarrier spacing, or may be a set of subcarrier spacings of one type. The subcarrier spacings of one type are related to a subcarrier spacing used by the base station to send the system information signal. That is, if the UE receives a system information signal generated based on the first subcarrier spacing, the second subcarrier spacing indicated by the indication information carried by the system information signal is a subcarrier spacing related to the first subcarrier spacing, where the first subcarrier spacing and the second subcarrier spacing may be the same or may be different. The base station may indicate the second subcarrier spacing by using a specific value, or may indicate the second subcarrier spacing by using a sequence number of a subcarrier spacing. More specifically, one first subcarrier spacing may correspond to one second subcarrier spacing, or one first subcarrier spacing may correspond to more than one second subcarrier spacing.

In operation S120, after receiving, from the base station, the system information signal generated based on the first subcarrier spacing, the UE determines, based on the indication information carried in a system information signal, the second subcarrier spacing required for generating the random access request signal. The UE may directly determine, based on a second subcarrier spacing indicated by the indication information, a subcarrier spacing used to send the random access response signal, or may determine, in one type of second subcarrier spacing indicated by the indication information, a subcarrier spacing used to send the random access response signal. Determining may be performed based on a downlink channel measurement result.

The UE sends the random access request signal to the base station after determining the second subcarrier spacing, and requests to access a cell of the base station. The random access request signal is sent to the base station by using the first transmission resource. The UE may obtain indication information of the first transmission resource based on the broadcast signal sent by the base station. The UE may notify the base station of the third subcarrier spacing and/or the fourth subcarrier spacing by using the first transmission resource for transmitting the random access request signal (where a subcarrier spacing corresponds to a type of a transmission resource, and the base station may determine, based on a transmission resource used by the UE to send the random access request signal, a subcarrier spacing selected by the UE). The third subcarrier spacing is the subcarrier spacing used by the UE to send the uplink signal, and the fourth subcarrier spacing is the subcarrier spacing used by the UE to monitor the downlink signal. That is, the UE needs to notify the base station of at least one of the subcarrier spacing used by the UE to send the uplink signal and the subcarrier spacing used by the UE to monitor the downlink signal. If the UE indicates only the third subcarrier spacing, the base station defaults that the UE monitors a signal generated based on the first subcarrier spacing (that is, a subcarrier spacing used by the base station to send a system information signal), and may generate the downlink signal based on the first subcarrier spacing. If the UE indicates only the fourth subcarrier spacing, the base station defaults that the UE sends a signal generated based on the second subcarrier spacing (that is, a subcarrier spacing used by the UE to send a random access request message), and may monitor the uplink signal sent based on the second subcarrier spacing. The third subcarrier spacing may be the same as the second subcarrier spacing, or may be different from the second subcarrier spacing. The fourth subcarrier spacing may be the same as the first subcarrier spacing, or may be different from the first subcarrier spacing.

In operation S130, the random access response signal sent by the base station to the UE includes the following two cases:

Case 1: The random access response signal includes acknowledgement information used by the base station to instruct the UE to access the network (or referred to as access a cell of the base station), and the UE may directly perform, after receiving the random access response signal, service data communication based on the third subcarrier spacing and/or the fourth subcarrier spacing and a transmission resource that is allocated by the base station by using downlink control information.

Case 2: The random access response signal includes instructing the UE to prepare to access the network, and the UE needs to report identification information of the UE to the base station, so that the base station formally determines that the UE may access the network.

Therefore, according to the communication method 100 in this application, the base station sends the synchronization signal and the system information signal that are generated based on the at least two types of subcarrier spacings, and after receiving the system information signal, the UE feeds back, to the base station, a subcarrier spacing used to transmit an uplink signal and/or a subcarrier spacing used to monitor a downlink signal that is determined by the UE, thereby supporting cell search for and random access to a network using a plurality of subcarrier spacings.

In one embodiment, when the random access response signal indicates that the UE prepares to access the network, the random access response signal further includes indication information used for indicating a second transmission resource, the second transmission resource is used for transmitting the uplink signal, and the method 100 further includes:

Operation S140: The UE sends, based on the second transmission resource and the third subcarrier spacing, a signal including a message 3 to the base station, where the message 3 includes identification information of the UE, so that the base station determines, based on the identification information, whether the UE may access the network.

Operation S150: The base station determines, based on the identification information, that the UE accesses the network.

Operation S160: The base station sends an access acknowledgement signal to the UE based on the fourth subcarrier spacing, where the access acknowledgement signal is used for instructing the UE to access the network.

In this application, if the random access response signal indicates that the UE prepares to access the network, the random access response signal further includes the information used for indicating the second transmission resource. The second transmission resource is used by the UE to send the identification information to the base station. The UE uses the second transmission resource to send the signal including the message 3 to the base station. The signal is generated based on the third subcarrier spacing. After receiving the message 3 sent by the UE, the base station may determine, based on the identification information of the UE that is carried in the message 3, that the UE may access the network, and send, to the UE, the access acknowledgement signal generated based on the fourth subcarrier spacing, to indicate that the UE accesses the network.

According to the communication method in this application, the UE reports the identification information of the UE, and the base station determines, based on the identification information, whether the UE may access a network, thereby avoiding a communication collision between terminal devices in a scenario in which there are many terminal devices in the network.

In one embodiment, the method 100 further includes:

Operation S170: The base station sends configuration information to the UE, where the configuration information is used for configuring a fifth subcarrier spacing, and the fifth subcarrier spacing is a subcarrier spacing used after the UE accesses the network.

The base station sends the configuration information to the UE after determining that the UE may access the network. The configuration information is used for allocating, to the UE, the subcarrier spacing used after the UE accesses the network. The subcarrier spacing may be the subcarrier spacing for monitoring the downlink signal, may be the subcarrier spacing for sending the uplink signal, or may indicate both the subcarrier spacings for receiving the downlink signal and sending the uplink signal. The fifth subcarrier spacing may be one type of subcarrier spacing, or may be a plurality of types of subcarrier spacings. The plurality of types of subcarrier spacings may include a primary subcarrier spacing. The primary subcarrier spacing may also be referred to as an anchor subcarrier spacing or a prior subcarrier spacing. The primary subcarrier spacing is one of the at least two subcarrier spacings specified by the base station. When the fifth subcarrier spacing is one type of subcarrier spacing, the one type of subcarrier spacing may also be referred to as the primary subcarrier spacing. The base station may determine, based on usage of time-frequency resources of different subcarrier spacings, a subcarrier spacing corresponding to a relatively idle resource as the primary subcarrier spacing of the UE, or may determine, based on a channel quality, a subcarrier spacing corresponding to a resource with relatively good channel quality as the primary subcarrier spacing of the UE.

The base station may modulate the configuration information in the access acknowledgement signal to send the configuration information to the UE, or send, after sending the access acknowledgement signal, the configuration information to the UE by using higher layer signaling, Media Access Control layer signaling, or a physical control channel.

In one embodiment, the base station may further configure a sixth subcarrier spacing for the UE in the configuration information, where the sixth subcarrier spacing is used as a subcarrier spacing that is used after the UE accesses the network and that is for sending the uplink signal.

In one embodiment, the configuration information is carried in the access acknowledgement signal, thereby reducing signaling overheads.

In one embodiment, the fifth subcarrier spacing includes at least two types of subcarrier spacings. In this way, the UE can use resources corresponding to a plurality of types of subcarrier spacings, to increase a communication rate between the base station and the UE.

In one embodiment, when the fifth subcarrier spacing includes the at least two types of subcarrier spacings, the UE may monitor, according to indication information of the base station, or a provision of a communication protocol or a communication standard, a downlink control channel sent based on the at least two types of subcarrier spacings; or the UE may monitor, according to indication information of the base station, or a provision of a communication protocol or a communication standard, a downlink control channel sent based on a primary subcarrier spacing of the at least two types of subcarrier spacings.

In one embodiment, the random access request signal includes a preamble sequence, and a type of the preamble sequence corresponds to the third subcarrier spacing and/or the fourth subcarrier spacing.

The random access request signal sent by the UE may further include the preamble sequence, so that the base station estimates a transmission delay between the base station and the UE based on the preamble sequence. The type of the preamble sequence corresponds to the third subcarrier spacing and/or the fourth subcarrier spacing. A correspondence between the type of the preamble sequence and the third subcarrier spacing and/or the fourth subcarrier spacing may be defined in advance. In this way, the UE can flexibly select a manner of indicating a subcarrier spacing used to transmit the uplink signal and/or detect the downlink signal.

The foregoing embodiment describes the solution of this application mainly from a perspective of exchange between the terminal device and the network device. It can be understood that, to implement the foregoing functions, devices include corresponding hardware structures and/or software modules for performing the functions. A person skilled in the art should easily be aware that, the units and algorithm operations in the examples described with reference to the embodiments disclosed in this specification may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional units of the terminal device and the network device may be divided according to the foregoing method example. For example, the functional units may be divided in correspondence with the functions, or two or more functions may be integrated into one processing unit. The integrated unit may be implemented in a form of hardware, or may be implemented in a form of a software functional unit. It should be noted that the unit division in this application is an example, and is merely logical function division. There may be another division manner in an actual implementation.

Figure 2:
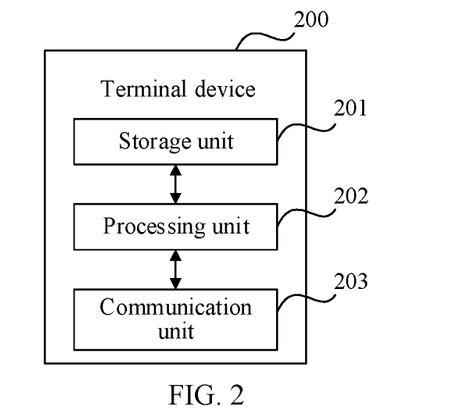
FIG. 2 is a schematic structural diagram of a terminal device according to one embodiment of this application.

When an integrated unit is used, FIG. 2 is a possible schematic structural diagram of the terminal device in the foregoing embodiment. The terminal device 200 includes a processing unit 202 and a communication unit 203. The processing unit 202 is configured to control and manage an action of the terminal device 200. For example, the processing unit 202 is configured to support the terminal device 200 in performing S120 in FIG. 1, and the processing unit 202 may further be configured to support the terminal device 200 in performing S140 in the method 100, and/or used in other processes of the technology described in this specification. The communication unit 203 is configured to support communication between the terminal device 200 and another network entity, for example, communication between the terminal device 200 and the base station in the method 100. The terminal device 200 may further include a storage unit 201, configured to store program code and data of the terminal device 200.

The processing unit 202 may be a processor or a controller, for example, may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The processor or the controller may implement or execute various examples of logical blocks, modules, and circuits described with reference to content disclosed in this application. Alternatively, the processor may be a combination implementing a computing function, for example, a combination of one or more microprocessors, or a combination of the DSP and a microprocessor. The communication unit 203 may be a transceiver, a transceiver circuit, or the like. The storage unit 201 may be a memory.

Figure 3:
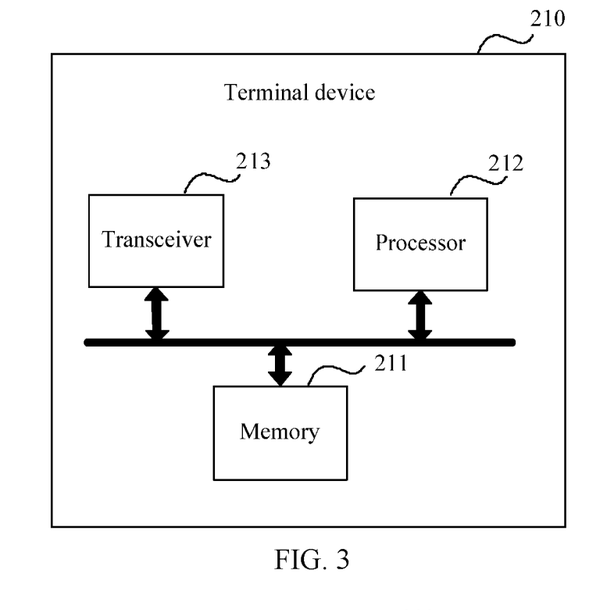
FIG. 3 is a schematic structural diagram of another terminal device according to another embodiment of this application.

When the processing unit 202 is a processor, the communication unit 203 is a transceiver, and the storage unit 201 is a memory, the terminal device in this application may be a terminal device shown in FIG. 3.

As shown in FIG. 3, the terminal device 210 includes: a processor 212, a transceiver 213, and a memory 211. The transceiver 213, the processor 212, and the memory 211 may communicate with each other, and transmit a control and/or data signal by using an internal connection path.

It may be clearly understood by a person skilled in the art that, for the purpose of convenient and brief description, for a detailed working process of the foregoing apparatus and unit, refer to a corresponding process in the foregoing method embodiments, and details are not described herein again.

Therefore, a terminal device provided in this application feeds back, to a network device after receiving a system information signal, a subcarrier spacing used to transmit an uplink signal and/or a subcarrier spacing used to monitor a downlink signal that is determined by the terminal device, thereby supporting cell search for and random access to a network using a plurality of subcarrier spacings.

Figure 4:
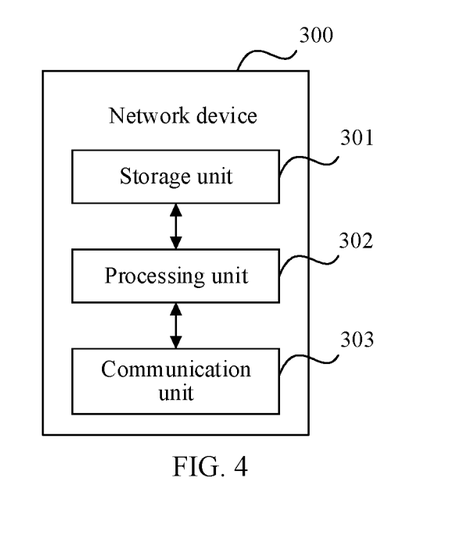
FIG. 4 is a schematic structural diagram of a network device according to one embodiment of this application.

When an integrated unit is used, FIG. 4 is a possible schematic structural diagram of the network device in the foregoing embodiments. A network device 300 includes a processing unit 302 and a communication unit 303. The processing unit 302 is configured to control and manage an action of the network device 300. For example, the processing unit 302 is configured to support the network device 300 in performing S110 and S130 in FIG. 1, and the processing unit 302 may further be configured to support the network device 300 in performing S150 and S160 in the method 100, and/or used in other processes of the technology described in this specification. The communication unit 303 is configured support communication between the network device 300 and another network entity, for example, communication between the network device 300 and the UE in the method 100. The network device 300 may further include a storage unit 301, configured to store program code and data of the network device 300.

The processing unit 302 may be a processor or a controller, for example, may be a CPU, a general purpose processor, a DSP, an ASIC, an FPGA or another programmable logic device, a transistor logic device, a hardware component, or any combination thereof. The processor or the controller may implement or execute various examples of logical blocks, modules, and circuits described with reference to content disclosed in this application. Alternatively, the processor may be a combination implementing a computing function, for example, a combination of one or more microprocessors, or a combination of the DSP and a microprocessor. The communication unit 303 may be a transceiver, a transceiver circuit, or the like. The storage unit 301 may be a memory.

Figure 5:
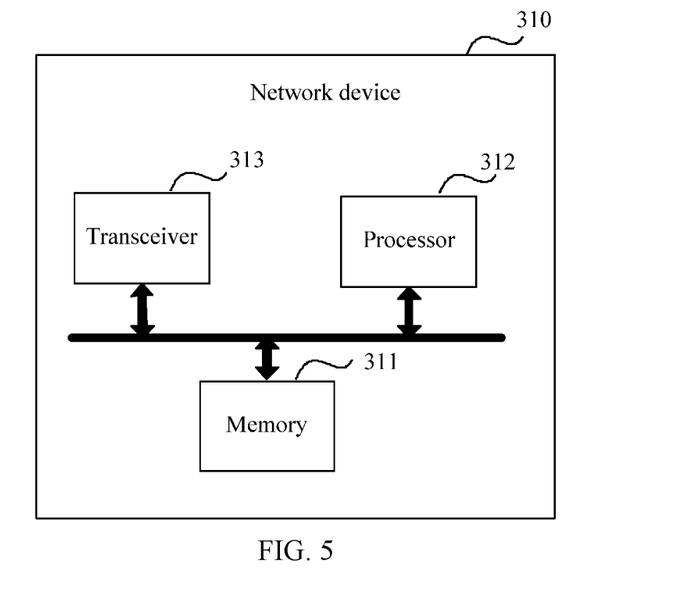
FIG. 5 is a schematic structural diagram of another network device according to another embodiment of this application.

When the processing unit 302 is a processor, the communication unit 303 is a transceiver, and the storage unit 301 is a memory, the network device in this application may be a network device shown in FIG. 5.

As shown in FIG. 5, the network device 310 includes a processor 312, a transceiver 313, and a memory 311. The transceiver 313, the processor 312, and the memory 311 may communicate with each other, and transmit a control and/or data signal by using an internal connection path.

It may be clearly understood by a person skilled in the art that, for the purpose of convenient and brief description, for a detailed working process of the foregoing apparatus and unit, refer to a corresponding process in the foregoing method embodiments, and details are not described herein again.

Therefore, the network device provided in this application sends a synchronization signal and a system information signal that are generated based on at least two types of subcarrier spacings, and receives a subcarrier spacing used to transmit an uplink signal and/or a subcarrier spacing used to monitor a downlink signal, where the subcarrier is determined by the terminal device and is fed back by the terminal device, thereby supporting cell search for and random access to a network using a plurality of subcarrier spacings.

It should be understood that the foregoing transceiver may include a transmitter and a receiver. The transceiver may further include an antenna, and a quantity of antennas may be one or more. The memory may be a separate device, or may be integrated in the processor. The devices or some of the devices may be integrated into a chip for implementation, for example, may be integrated into a baseband chip for implementation.

Network devices or terminal devices in apparatus and method embodiments completely correspond to each other. A corresponding operation is performed by a corresponding module. For example, a sending module or a transmitter performs a operation of sending in the method embodiments, a receiving module or a receiver performs a operation of receiving in the method embodiments, and other operations other than operations of sending and receiving may be performed by a processing module or a processor. For a function of a specific module, refer to corresponding method embodiments, and details are not described again.

This application further provides a communication chip, storing an instruction. When the instruction is run on the terminal device 200 or the terminal device 210, the communication chip is enabled to perform the methods corresponding to the terminal device or the UE in the foregoing implementations.

This application further provides a communication chip, storing an instruction. When the instruction is run on the network device 300 or the network device 310, the communication chip is enabled to perform the methods corresponding to the network device or the base station in the foregoing implementations.

In the embodiments of this application, sequence numbers of the processes do not mean execution sequences. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm operations described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in a terminal device. In addition, the ASIC may be located in the network device. Certainly, the processor and the storage medium may exist in a terminal device and a network device as discrete components.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instruction may be stored in a computer readable storage medium, or transmitted by using the computer readable storage medium. The computer instruction may be transmitted from a website, computer, server, or data center to another website, computer, server, or data center in a wired (for example, by using a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD), a semiconductor medium (for example, a solid-state drive (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A communication method, comprising:
   receiving, by a terminal device from a network device, a synchronization signal and a system information signal that are generated based on a first subcarrier spacing, wherein the system information signal comprises indication information used for indicating a second subcarrier spacing, and the second subcarrier spacing is a subcarrier spacing used by the terminal device to send a random access request signal, the second subcarrier spacing is determined based on a downlink channel measurement result and a type of subcarrier spacing indicated by the indication information, wherein the network device can support a plurality of types of subcarrier spacings;
   sending, by the terminal device, the random access request signal to the network device based on the second subcarrier spacing and a first transmission resource, wherein the random access request signal comprises a preamble sequence, and a type of the preamble sequence corresponds to a third subcarrier spacing and/or a fourth subcarrier spacing, the third subcarrier spacing is a subcarrier spacing used by the terminal device to send an uplink signal, and the fourth subcarrier spacing is a subcarrier spacing used by the terminal device to monitor a downlink signal; and
   receiving, by the terminal device from the network device, a random access response signal generated based on the fourth subcarrier spacing, wherein the random access response signal is used for instructing the terminal device to access a network or the random access response signal is used for instructing the terminal device to prepare to access a network.

2. The method according to claim 1, wherein when the random access response signal indicates that the terminal device is to prepare to access the network, the random access response signal further comprises indication information used for indicating a second transmission resource, the second transmission resource is used for transmitting the uplink signal, the method further comprising:
   sending, by the terminal device based on the second transmission resource and the third subcarrier spacing, a signal comprising a message 3 to the network device, wherein the message 3 comprises identification information of the terminal device; and
   receiving, by the terminal device from the network device, an access acknowledgement signal generated based on the fourth subcarrier spacing, wherein the access acknowledgement signal is used for instructing the terminal device to access the network.

3. The method according to claim 2, further comprising:
   receiving, by the terminal device, configuration information from the network device, wherein the configuration information is used for configuring a fifth subcarrier spacing, and the fifth subcarrier spacing is a subcarrier spacing used after the terminal device accesses the network.

4. The method according to claim 3, wherein the configuration information is carried in the access acknowledgement signal.

5. A communication method, comprising:
   sending, by a network device, a synchronization signal and a system information signal that are generated based on at least two types of subcarrier spacings, wherein the system information signal comprises indication information used for indicating a second subcarrier spacing, and the second subcarrier spacing is a subcarrier spacing used by a terminal device to send a random access request signal, wherein the network device can support a plurality of types of subcarrier spacings;
   receiving, by the network device from the terminal device by using a first transmission resource, the random access request signal generated based on the second subcarrier spacing, the second subcarrier spacing is determined based on a downlink channel measurement result and a type of subcarrier spacing indicated by the indication information, wherein the random access request signal comprises a preamble sequence, and a type of the preamble sequence corresponds to a third subcarrier spacing and/or a fourth subcarrier spacing, the third subcarrier spacing is a subcarrier spacing used by the terminal device to send an uplink signal, and the fourth subcarrier spacing is a subcarrier spacing used by the terminal device to monitor a downlink signal; and sending, by the network device to the terminal device, a random access response signal generated based on the fourth subcarrier spacing, wherein the random access response signal is used for instructing the terminal device to access a network or the random access response signal is used for instructing the terminal device to prepare to access a network.

6. The method according to claim 5, wherein when the random access response signal indicates that the terminal device is to prepare to access the network, the random access response signal further comprises indication information used for indicating a second transmission resource, the second transmission resource is used for transmitting the uplink signal, the method further comprising:

receiving, by the network device from the terminal device by using the second transmission resource, a signal that comprises a message 3 and that is generated based on the third subcarrier spacing, wherein the message 3 comprises identification information of the terminal device;

determining, by the network device based on the identification information, that the terminal device accesses the network; and sending, by the network device, an access acknowledgement signal to the terminal device based on the fourth subcarrier spacing, wherein the access acknowledgement signal is used for indicating that the terminal device accesses the network.

7. The method according to claim 6, further comprising:
sending, by the network device, configuration information to the terminal device, wherein the configuration information is used for configuring a fifth subcarrier spacing, and the fifth subcarrier spacing is a subcarrier spacing used after the terminal device accesses the network.

8. The method according to claim 7, wherein the configuration information is carried in the access acknowledgement signal.

9. The method according to claim 7, wherein the fifth subcarrier spacing comprises at least two types of subcarrier spacings.

10. An apparatus, comprising a processor and a transceiver, wherein
the transceiver is configured to: receive, from a network device, a synchronization signal and a system information signal that are generated based on a first subcarrier spacing, wherein the system information signal comprises indication information used for indicating a second subcarrier spacing, and the second subcarrier spacing is a subcarrier spacing used by the terminal device to send a random access request signal, the second subcarrier spacing is determined based on a downlink channel measurement result and a type of subcarrier spacing indicated by the indication information, wherein the network device can support a plurality of types of subcarrier spacings;

the transceiver is configured to: send the random access request signal to the network device based on the second subcarrier spacing and a first transmission resource, wherein the random access request signal comprises a preamble sequence, and a type of the preamble sequence corresponds to a third subcarrier spacing and/or a fourth subcarrier spacing, the third subcarrier spacing is a subcarrier spacing used by the terminal device to send an uplink signal, and the fourth subcarrier spacing is a subcarrier spacing used by the terminal device to monitor a downlink signal; and the transceiver is configured to: receive, from the network device, a random access response signal generated based on the fourth subcarrier spacing, wherein the random access response signal is used for instructing the terminal device to access a network or the random access response signal is used for instructing the terminal device to prepare to access a network.

11. The apparatus according to claim 10, wherein when the random access response signal indicates that the terminal device is to prepare to access the network, the random access response signal further comprises indication information used for indicating a second transmission resource, the second transmission resource is used for transmitting the uplink signal, and
the transceiver is further configured to:
send, based on the second transmission resource and the third subcarrier spacing, a signal comprising a message 3 to the network device, wherein the message 3 comprises identification information of the terminal device; and
receive, from the network device, an access acknowledgement signal generated based on the fourth subcarrier spacing, wherein the access acknowledgement signal is used for instructing the terminal device to access the network.

12. The apparatus according to claim 11, wherein the transceiver is further configured to receive configuration information from the network device, wherein the configuration information is used for configuring a fifth subcarrier spacing, and the fifth subcarrier spacing is a subcarrier spacing used after the terminal device accesses the network.

13. The apparatus according to claim 12, wherein the configuration information is carried in the access acknowledgement signal.

14. An apparatus, comprising a processor and a transceiver, wherein
the transceiver is configured to: send a synchronization signal and a system information signal that are generated based on at least two types of subcarrier spacings, wherein the synchronization signal is used for a terminal device to receive the system information signal, the system information signal comprises indication information used for indicating a second subcarrier spacing, and the second subcarrier spacing is a subcarrier spacing used by the terminal device to send a random access request signal, wherein the transceiver can support a plurality of types of subcarrier spacings;
the transceiver is further configured to: receive, from the terminal device by using a first transmission resource, the random access request signal generated based on the second subcarrier spacing, the second subcarrier spacing is determined based on a downlink channel measurement result and a type of subcarrier spacing indicated by the indication information, wherein the random access request signal comprises a preamble sequence, and a type of the preamble sequence corresponds to a third subcarrier spacing and/or a fourth subcarrier spacing, the third subcarrier spacing is a subcarrier spacing used by the terminal device to send an uplink signal, and the fourth subcarrier spacing is a subcarrier spacing used by the terminal device to monitor a downlink signal; and the transceiver is further configured to: send, to the terminal device, a random access response signal generated based on the fourth subcarrier spacing, wherein the random access response signal is used for instructing the terminal device to access a network or the random access response signal is used for instructing the terminal device to prepare to access a network.

15. The apparatus according to claim 14, wherein when the random access response signal indicates that the terminal device prepares to access the network, the random access response signal further comprises indication information used for indicating a second transmission resource, the second transmission resource is used for transmitting the uplink signal, and the transceiver is further configured to: receive, from the terminal device by using the second transmission resource, a signal that comprises a message 3 and that is generated based on the third subcarrier spacing, wherein the message 3 comprises identification information of the terminal device;

the processor is configured to:

determine, based on the identification information, that the terminal device accesses the network; and cause the transceiver to send an access acknowledgement signal to the terminal device based on the fourth subcarrier spacing, wherein the access acknowledgement signal is used for instructing the terminal device to access the network.

16. The apparatus according to claim 15, wherein the transceiver is further configured to send configuration information to the terminal device, wherein the configuration information is used for configuring a fifth subcarrier spacing, and the fifth subcarrier spacing is a subcarrier spacing used after the terminal device accesses the network.

17. The apparatus according to claim 16, wherein the configuration information is carried in the access acknowledgement signal.

* * * * *